United States Patent [19]

Yamada

[11] Patent Number: 4,622,582

[45] Date of Patent: Nov. 11, 1986

[54] ASYNCHRONOUS COLOR IMAGE PROCESSING SYSTEM WITH A PLURALITY OF PICTURE INPUT UNITS AND A PLURALITY OF PICTURE REPRODUCING UNITS SELECTED IN ACCORDANCE WITH A PREDETERMINED ORDER OF PREFERENCE

[75] Inventor: Mitsuhiko Yamada, Kyoto, Japan

[73] Assignee: Dainippon Screen Seizo Kabushiki Kaisha, Kyoto, Japan

[21] Appl. No.: 569,393

[22] Filed: Jan. 9, 1984

[51] Int. Cl.$^4$ .................... G03F 3/08; H04N 1/46; H04N 1/20; H04N 1/40

[52] U.S. Cl. ........................... 358/80; 358/75; 358/257; 358/258; 358/280

[58] Field of Search ............ 358/75, 76, 77, 78, 358/79, 80, 280, 257, 256, 181, 258, 903; 364/526

[56] References Cited

U.S. PATENT DOCUMENTS

| | | | |
|---|---|---|---|
| 4,258,335 | 3/1981 | Greenberg et al. | 358/80 |
| 4,285,009 | 8/1981 | Klopsch | 358/76 |
| 4,319,268 | 3/1982 | Yamada | 358/75 |
| 4,335,398 | 6/1982 | Yamada | 358/80 |
| 4,383,277 | 5/1983 | Kubo | 358/258 |
| 4,402,007 | 8/1983 | Yamada | 358/80 |
| 4,438,459 | 3/1984 | Levine | 358/258 |
| 4,511,928 | 4/1985 | Colomb | 358/280 |
| 4,563,706 | 1/1986 | Nagashima | 358/280 |

FOREIGN PATENT DOCUMENTS 127468  7/1983  Japan ....................... 358/256

OTHER PUBLICATIONS

Affeldt, Jurgen (Editor), et al., Klischograph 1/79, Dr.-Ing, Rudolf Hell GmbH, Kiel, West Germany, 1979, pp. 4–7 and 18–21.

Primary Examiner—James J. Groody
Assistant Examiner—Randall S. Svihla
Attorney, Agent, or Firm—Hayes, Davis & Soloway

[57] ABSTRACT

An asynchronous color separation system comprises a plurality of picture input units for supplying a set of color-separated picture signals corresponding respectively to color components to be subjected to color tone controls. A scanner data processor is provided for selectively receiving the set of color-separated picture signals from the plurality of picture input units and contains at least one set of look-up tables adapted to carry out desired color tone controls on the thus-received set of color-separated picture signals. A plurality of picture reproducing units includes at least one central processing unit. The central processing unit selectively controls the distribution of color separated picture signals from the scanner data processor to the various reproducing units in accordance with a predetermined order of preference. The reproducing units provide a reproduced permanent or temporary picture. The scanner data processor may include a plurality of sets of look-up tables corresponding to the plurality of picture input units.

4 Claims, 5 Drawing Figures

ASYNCHRONOUS COLOR IMAGE PROCESSING SYSTEM WITH A PLURALITY OF PICTURE INPUT UNITS AND A PLURALITY OF PICTURE REPRODUCING UNITS SELECTED IN ACCORDANCE WITH A PREDETERMINED ORDER OF PREFERENCE

BACKGROUND OF THE INVENTION (1) Field of the Invention

This invention relates to a color separation system which is capable of systematically controlling various picture input and output units, such as color scanners, used in a process for making printing plates.

(2) Decription of the Prior Art

A photographic plate-making process requires a color separation system for color-separating an original picture to be printed so that printing colors are determined. A color scanner, which converts picture signals to four-color proof signals suitable for reproduction by printing techniques, provides printing plates corresponding to the printing inks of the four colors, namely the yellow(Y), magenta(m), cyan(C) and black(K) inks, or photographic films suitable for use in the fabrication of such printing plates.

Such color scanners may be roughly classified into the following groups, depending or their functions and peripheral equipments:

(1) so-called monofunctional scanners, each of which is adapted to set up, color-separate and print directly on a photographic film or the like, originals one by one;

(2) so-called layout scanners, each of which is adapted to store data for a color-separated picture in a mass storage such as disc memory or the like and then to control the thus-stored data suitably by means of a computer, thereby printing the thus-stored data together with picture data, which are separately supplied and may include other picture signals, characters and the like, on a photographic film of the like in accordance with a designated layout; and (3) setting-up units, each of which is adapted to simulate beforehand color separation conditions in a desired output state (in a printed form) so as to establish the setting-up conditions of a color scanner by means of a color monitor.

However, units such as these monofunctional color scanner, layout scanner, original setting-up unit and the like have heretofore been used as independent units in a photographic plate-making process and their functions have not thus been shared by one another. Hence, the efficiency of their use has been poor. This inefficiency can be attributed to the fact that the picture input systems in the monofunctional color scanner, original setting-up unit, layout scanner and the like handle multicolored picture signals respectively by methods which are different from one another and the arithmetic processing unit and picture reproducing unit cannot thus be designed systematically.

Moreover, conventional arithmetic processing units are primarily constructed of analog circuits. Their setting-up operations are carried out by operating, for example, their potentiometers or rotary switches. Therefore, their use efficiencies are low and their standardization with the picture input unit and picture reproducing unit have encountered difficulties.

SUMMARY OF THE INVENTION

With the foregoing in view, an object of this invention is to provide a color separation system in which all functions in color separation are systematically designed so as to carry out each color separation and processing process efficiently and simply by using an arithmetic processing unit and picture reproducing unit which can be commonly used for all of various picture signals to be supplied from a plurality of picture input units.

In one aspect of this invention, there is thus provided a color separation system comprising:

a plurality of picture input units for supplying a set of color-separated picture signals corresponding respectively to color components to be subjected to color tone controls;

a scanner data processor for selectively and respectively receiving the set of color-separated picture signals from the plurality of picture input units and containing at least one set of look-up tables adapted to carry out desired color tone controls on the thus-received set of color-separated picture signals; and a plurality of picture reproducing units including at least one central processing unit adapted to control the selection of signals and the scanner data processor, to which reproducing units the set of color-separated signals the color tones of which have been controlled are distributed so as to obtain a reproduced permanent or temporary picture.

The above system can be readily expanded, for example, by connecting a plurality of scanner input scanning parts with a single scanner data processor unit so as to conduct the simultaneous color separation processings of a plurality of originals. Thus, functions common to units can be utilized commonly in accordance with the application purpose of each user, thereby achieving with ease the efficient utilization of the system.

In a conventional color separation system, the system has been contructed by imparting all necessary functions to each of its units separately. However, it is feasible, in a system according to this invention, to connect units having only independent functions together as needed. Thus, the present invention permits to achieve the manufacturing cost reduction and the simplification of adjustment.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENT

Figure 1:
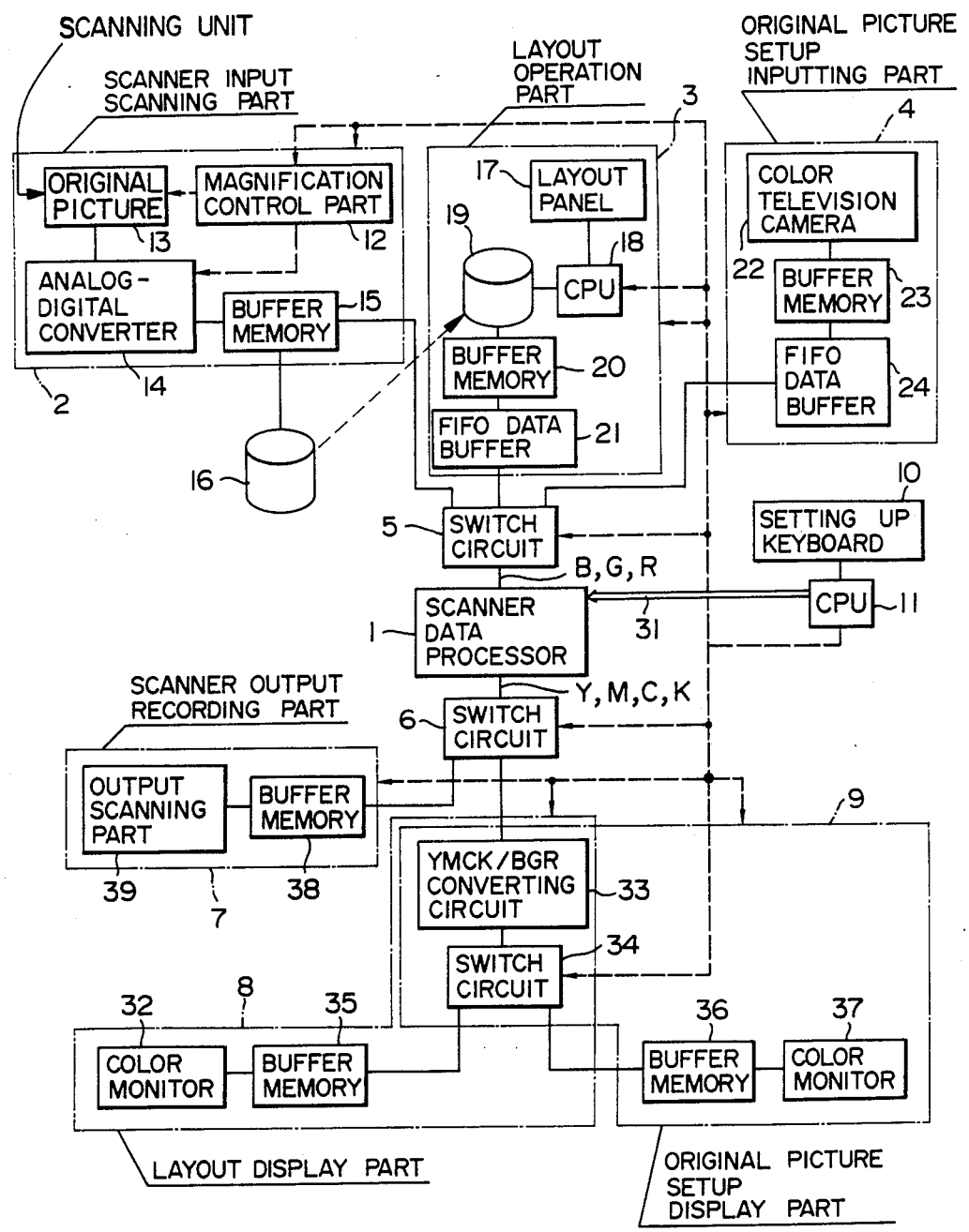
FIG. 1 is a simplified block diagram showing a color separation system according to one embodiment of this invention.

FIG. 1 illustrates the construction of one embodiment of this invention. A scanner input scanning part 2, a layout operation part 3 and an original picture setup inputting part 4 are respectively connected to a scanner data processor 1 via an input-side switch circuit 5.

To an output-side switch circuit 6 of the scanner data processor 1, are connected a scanner output recording part 7, a layout display part 8 and an original picture setup display part 9.

Numeral 10 indicates a setting-up keyboard. Color separation conditions for each original, whicn are input by the keyboard 10, are controlled at an arithmetic processing unit (hereinafter called "CPU") 11. The scanner data processor 1, scannner input scanning part 2, layout operation part 3, original picture setup inputting part 4, switch circuits 5, 6, scanner output recording part 7, layout display part 8 and original picture setup display part 9 are all controlled by control signals from the CPU 11.

In the thus-constructed color separation system, input signals from picture input units such as the scanner input scanning part 2, layout operation part 3 and original picture setup inputting part 4 are processed by time-division techniques at the scanner data processor 1 and then transmitted suitably to the scanner output recording part 7, layout display part 8 or original picture setup display part 9.

The scanner input scanning part 2 is constructed of a magnification control part 12 for controlling the magnification of the scanning of each original in accordance with a magnification given by the CPU 11, an original picture scanning unit 13 adapted to read the picture information of each original on a drum as electrical signals, an analog-digital (A/D) converter 14 adapted to convert analog signals output from the original scanning unit 13 to digital signals, and a buffer memory 15 having a capacity equivalent to two scanning lines per each original scanning line.

A disc memory 16 serves to temporarily store picture signals for layout operations.

The layout operation part 3 is constructed of a layout panel 17, a CPU 18 for receiving setup information from the CPU 11 together with layout command signals from the layout panel 17, a disc memory 19, a buffer memory 20 for outputting multi-colored picture signals, and a data buffer 21 of the FIFO (first in and first out) type.

The original picture setup inputting part 4 is composed of a color television camera 22, a buffer memory 23 and a data buffer 24 of the FIFO type.

The scanner output recording part 7, to which picture data are output via the switch circuit 6, is constructed of a buffer memory 38 adapted to temporarily accumulate data and to synchronize the data with a rotary drum, associated with an output scanning part 39.

Futhermore, the system includes a layout display part 8 and original picture setup display part 9. These parts will be described in detail herein.

Figure 2:
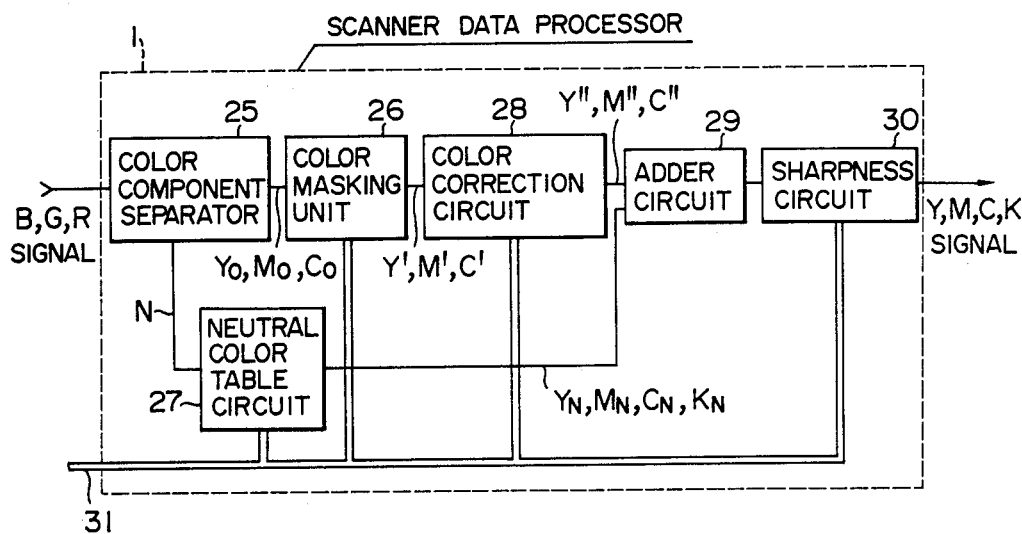
FIG. 2 is a block diagram showing a scanner data processor of the color separation system.

FIG. 2 is a block diagram showing the structure of the scanner data processor 1. To this scanner data processor 1, picture signals are input as blue(B) signals, green(G) signals and red(R) signals.

Numeral 25 indicates a color component separator. Color components $Y_o$, $M_o$ and $C_o$ are output to a color masking unit 26, whereas neutral component N is output to a neutral color table circuit 27. The color masking unit 26 produces outputs Y', M', and C' and is connected via a color correction circuit 28 to an adder circuit 29, whereby to add outputs $Y_N$, $M_N$, $C_N$, and $K_N$ from the neutral color table circuit 27 respectively to outputs Y", M" and C" from the color correction circuit 28 and then to feed the results to a sharpness circuit 30.

The above-mentioned parts, units, circuits, etc. may be the same as those described in detail in Japanese Kokais 55-142342 and 55-142345, both filed in the name of the present assignee.

The color masking unit 26, neutral color table circuit 27 and color correction circuit 28 are respectively and principally constructed of look-up tables and are respectively connected by way of the CPU line 31 to the CPU 11, similar to the sharpness circuit 30 so that they can be controlled by the CPU 11. This CPU line 31 includes a data bus, address bus, control bus, and the like.

The thus-constructed scanner data processor 1 performs, in a digital mode, arithmetic processings which are necessary to reproduce a picture with an operation processing time for a set of B, G and R signals by the scanner processor of about 2 $\mu$sec. on the basis of B-, G- and R-signals which are input in accordance with a constant clock (normally, a clock of 3–5 $\mu$sec.).

At the color component separator 25, color components B, G, and R are separated into $Y_o$, $M_o$ and $C_o$, which are thereafter converted at the color masking circuit 26 to Y', M' and C' in accordance with a color masking table established by a setup data already given as color separation conditions for each original. Then, Y', M' and C' are converted to Y", M" and C" by accessing the look-up table of the color correction circuit 28.

The neutral component N is subjected to such calculation processings as gradation correction corresponding to each color-separated plate and UCR (under-color removal) correction by means of the neutral color table of the neutral color table circuit 27, and thus converted to signals $Y_N$, $M_N$, $C_N$ and $K_N$ with respect to each plate.

Thereafter, the neutral component and color components are added at the adder circuit 29 with respect to each plate. Then, each signal is independently emphasized in sharpness at the sharpness circuit 30, thereby outputting Y-, M-, C- and K-signals.

The sharpness circuit 30 generally has a signal processing process which is independent from the color separation processing operation. For example, it is possible to adopt the method disclosed in Japanese Kokai 56-8140 filed by the present assignee.

Where signals are delivered to the scanner data processor at the same time from a plurality of input devices, it is necessary to number the input devices in the order of preference or priority so that the signals can be subjected to a data processing by time-division techniques. In the circuit blocks in this scanner processor only one of the blocks is not required to be fed data from external sources (i.e., the CPU 11). However, parameter-requiring parts and look-up table parts are respectively equipped with as many data registers and look-up tables as the number of the plural input devices.

The above method will be described in detail herein.

Color separation conditions which are required for each original to prepare parameters and a look-up table are stored, for example, in the form of the conditions obtained at the original picture setup inputting part 4 in the CPU with the title of the original. When performing the setting-up of an original, conditions are given to the CPU 11 by means of the key board 10 so that data are delivered by the CPU 11 to a data register and look-up table which correspond to the given input device.

The CPU 11 specifies the magnification for an original to be subjected to color separation. Thus, the CPU 11 controls the motor speed of the input scanning head in the subscanning direction and the sampling timing of the A/D converter 14 in the main scanning direction. Besides, the CPU 11 controls the switch circuits 5 and 6 provided respectively at the input and output sides of the scanner data processor 1.

At the original picture setup inputting part 4, an original is scanned by the color television camera 22 and resulting BGR signals are written as color information in the buffer memory 23. The BGR signals are thereafter output from the buffer memory 23, through the data buffer 24, and to the switch circuit 5.

Next, the processing operation of picture signals at the layout operation part 3 will be described.

To perform a layout, all picture data are first of all scanned and input by the scanner input scanning part 2 or the like and then accumulated in a mass storage such as the disc memory 16.

Now, at the disc memory 19, the disc memory 16 is coupled with the CPU 18 by utilizing a disc pack from the disc memory 16 in which prescribed picture data have already been stored. The color monitor 32 of the layout display part 8 is then used upon trimming (or positioning) original pictures to designated areas or superposing original pictures, which is a basic procedure of layout operations.

Namely, in the layout display part 8, an YMCK/BGR conversion circuit 33 which receives Y-, M-, C- and K-signals from the switch circuit 6 and converts tnem to B-, G- and R-signals which which are connected to the color monitor 32 via a switch circuit 34 and buffer memory 35.

The CPU 18 gives a read-out command to the disc memory 19 so that specific picture data are first of all transferred to the buffer memory 20 in a unit amount such as that equivalent to one track of the disc memory 19. The thus-transferred picture data are delivered at a fast speed from the data buffer 21, via the switch circuit 5 and to the scanner data processor 1.

The picture data are converted to Y-, M-, C- and K-signals in accordance with the setup signals from the CPU 11 and then delivered via the switch circuit 6, YMCK/BGR conversion circuit 33 and switch circuit 34 to the buffer memory 35, where they are stored.

The CPU 18 controls picture data of originals, original by original, in the names of their titles relative to the CPU 11.

Since picture data supplied from the buffer memory 35 and displayed at the color monitor 32 may be smaller in number than picture signals obtained by the scanner input scanning part 2, the CPU 18 equalizes a certain plurality of picture elements or merely make the output frequency longer when picture data are output from the disc memory 19 to the buffer memory 20, and the number of picture elements is hence decreased to a number which is required for display at the color monitor 32. The resultant picture data are then sent to the buffer memory 35 via the switch circuit 5, scanner data processor 1, switch circuit 6, YMCK/BGR conversion circuit 33 and switch circuit 34.

The above-mentioned data processing is described in detail, for example, in Japanese Patent Application No. 57-202299 (now, Japanese Kokai 59-91444) filed by the present assignee.

After picture data required to lay out one frame have been written in the buffer memory 35 in the above manner, their reading-out onto the color monitor 32 is controlled so that pictures are synthesized or shifted to make a picture of desired layout.

The details of layout conditions of the buffer memory 35, which conditions correspond to a completed layout, are stored in the CPU 18. The color separation conditions for each original displayed on the color monitor 35 are input in the title of the original in and controlled by the scanner data processor 1 as data determining optimum conditions by means of the original picture setup inputting part 4 and original picture setup display part 9. Therefore, a predicted picture (reproduced temporary picture) simulating a picture to be reproduced by printing techniques in accordance with the above conditions is displayed on the color monitor 32.

In the actual laying-out operation, all processings including combination of pictures and shifting of pictures for their arrangement are carried out by causing the CPU 18 to deliver pictures from the disc memory 19 to an unillustrated layout outputting magnetic disc on the basis of the abovementioned layout data and to write the pictures in designated positions of the outputting magnetic disc in accordance with the BGR signals.

The layout outputting magnetic disc is controlled by the CPU 11, while storing the color separation conditions and the like as data to be given to the scanner data processor 1.

This means that setup information has already been prepared corresponding respectively to the titles of originals at the original picture setup inputting part 4.

If a plurality of pictures is contained in a single scanning line of the layout output, the pictures may be output under the same color separation conditions. Alternatively, they may be kept together only when being output from the scanner data processor and may then be switched as needed in accordance with the arrangement of pictures by using a plurality of data registers or look-up tables.

Where the layout output is a complexly-synthesized one, the operation can practically be performed under the same color separation conditions.

Although not illustrated in FIG. 1, it may be feasible to additionally provide a magnetic disc as an output of the switch circuit 6 so that Y-, M-, C- and K-signals, which have been obtained by converting data on each original from the layout operation part 3, are successively stored for example in a floppy disc and the thus-stored Y-, M-, C- and K-signals are used as inputs to the disc memory 19 to carry out the layout operation in accordance with the Y-, M-, C- and K-signals.

In this case, picture signals are caused to pass over the scanner data processor 1 when data are output or a layout is displayed. Here again, the concept of this invention are very meritorious on the following points.

Namely, a laying-out operation such as an arrangement (combination), synthesis or the like of pictures is first of all' performed by means of BGR signals (here, the scanner data processor is used) and its information is hence completed. Next, the YMCK conversion is performed on each original by means of the scanner data processor 1, thereby providing an output temporary disc. A laid-out output disc is prepared still in the form of Y-, M-, C- and K-signals at the layout operation part 3, using the output temporary disc. Finally, the laid-out output disc is output, as is, to the scanner output recording part.

It is very meritorious that information on each complicated layout processing can be prepared by means of BGR signals, because the disc access time can be shortened owing to the fewer pieces of data and the color separation conditions may be changed as needed upon converting the BGR signals to Y-, M-, C- and K-signals.

Picture data of the layout display part 8 can precisely reflect the quality of a reproduced picture (reproduced permanent picture) at the scanner output recording part 7 by converting the BGR signals from the layout operation part 3 to Y-, M-, C- and K-signals at the scanner data processor 1 and reconverting the Y-, M-, C- and K-signals at the YMCK/BGR conversion circuit 33.

The original picture setup display part 9 shares the YMCK/BGR conversion circuit 33 and switch circuit 34 with the layout display part 8 and is connected to the color monitor 37 via the buffer memory 36.

The color television camera 22 of the original picture setup inputting part 4 scans each original to be color-separated and writes its BGR outputs as color information in the buffer memory 23.

Multi-colored picture signals are supplied from tne buffer memory 23, via the data buffer 24, to the switch circuit 5. Similar to picture data from the data buffer 21 of the layout operation part 3, the picture data from the original picture setup inputting part 4 are subjected to an arithmetic processing at the scanner data processor 1. The thus-processed data are then input via the switch circuit 6 to the YMCK/BGR conversion circuit 33 so that they are converted back to BGR display signals. The BGR display signals are thereafter delivered through the switch circuit 34 and are then written in the buffer memory 36.

All data of the buffer memory 23 are repeatedly transferred to the buffer memory 36 until an optimum picture (reproduced temporary picture) is obtained as a result that an operator changes the contents of setting of the look-up tables of the scanner data processor 1 by the CPU 11 and repeats the color correction, gradation correction, UCR correction and the like by operating the setting-up keyboard 10 while watching pictures reproduced and displayed on the color monitor 37.

Optimum original picture setup information is determined in the above manner and is stored together with the title of the original picture in the CPU 11. It is called out through the scanner data processor 1 for its use upon performing a color-separation processing at the scanner output recording part 7 or a layout processing at the layout operation part 3.

Incidentally, the density of sampling at the original picture setup display part 9 is generally about 500 picture elements by 500 picture elements in the case of one frame display. On the other hand, the original picture scanning density of the scanner input scanning part 2 is much higher than the sampling density of the color television camera 22. Accordingly, it is generally undesired to supply outputs of the original picture setup inputting part 4 directly to the scanner output recording part 7 so that a printed film is obtained.

However, certain techniques have in recent years been practiced to use television pictures as originals for printing purposes. Thus, it is possible to obtain Y-, M-, C- and K-signals for the scanner output recording part 7 by using original picture setup pictures.

The setting-up method making use of the setup keyboard 10 or the setting-up method of each look-up table in the scanner data processor 1 can be determined by the manner of preparation of the software of the CPU 11.

When the gradation of a specific color plate is modified for example, the title of the specific color plate and a desired gradation curve are designated by means of the setup keyboard 10. The look-up table of the scanner data processor 1 is then prepared by the CPU 11 in accordance with the gradation correction curve. Here, a standardized normal value is given as the initial condition of the look-up table.

Next, description will be made on the manner in which picture data are supplied from the scanner input scanning part 2 to the scanner output recording part 7 in accordance with setup data.

At the scanner input scanning part 2, an original wrapped on a drum is main-scanned in the direction of rotation of the drum in the original picture scanning unit 13. At the same time, the scanning head is caused to sub-scan in the axial direction of the drum. The light source of the scanning head illuminates the original, and transmitted or reflected light is then collected by a pick-up lens. The light is color-separated by means of a color separation filter and the resulting picture information on the original is converted to electrical signals by means of a photoelectric transducer.

Prior to the initiation of each scanning in the original picture scanning unit 13, the CPU 11 indicates a magnification for the original to the magnification control part 12 and the contents of the look up table and register in the scanner data processor 1 are set in accordance with the setup data.

By the way, the picture signals produce an effective picture part like a burst per every rotation of the drum, and picture signals input to the buffer memory 15 are subjected to masking processings.

The magnification is carried out in the following manner. Supposing that the width of the output scanning line of the scanner output recording part 7 be l, the scanning can be performed with a magnification of M by controlling the motor in such a way that the sub-scanning moves by l/M in the axial direction of the input drum per every single revolution of the input drum. In the main scanning direction, an A/D conversion is carried out to achieve l'/M when the sampling width on the recording drum is supposed to be l'.

Since the buffer memory 15 has a capacity equivalent to two lines per every original picture scanning line, picture data written in along one line of the buffer memory 15 are read out to the scanner data processor 1 and then supplied as Y-, M-, C- and K-signals to the scanner output recording part 7 while the input scanning has moved to the subsequent line and the remaining line of the buffer memory 15 is written in.

The scanner output recording part 7 is constructed of a buffer memory 38 and an output scanning part 39. The buffer memory 38 is also formed as a buffer memory having a capacity equivalent to 2 lines per every original picture scanning line.

The drum of the output scanning part 39 is also synchronized with tne rotation of the input drum. Y-, M-, C- and K-signals supplied to the buffer memory 38 are input to the output scanning part 39 while being deferred by one line, thereby completing the transfer of the picture.

The color separation system in which the scanner data processor 1 is shared by various picture input and output devices as mentioned above is provided with the switch circuits 5 and 6 respectively at the input and output sides thereof so that picture signals are selectively input from a specific picture input device and are selectively output to a specific picture output device, both of which input and output devices are connected to the scanner data processor 1.

Figure 3:
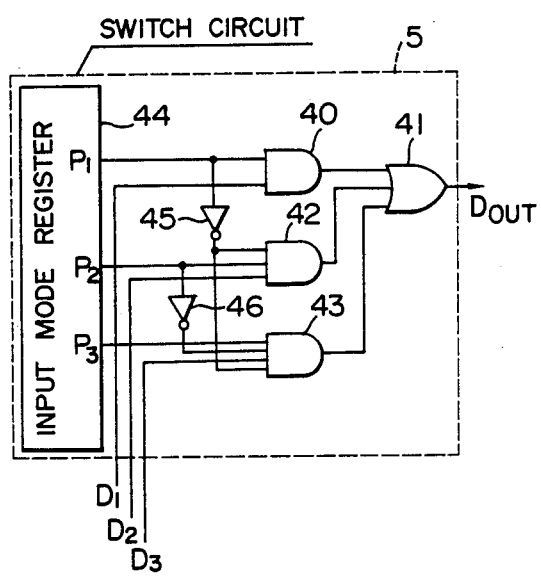
FIG. 3 is a circuit diagram illustrating an input-side switch circuit of the color separation system.
Figure 4:
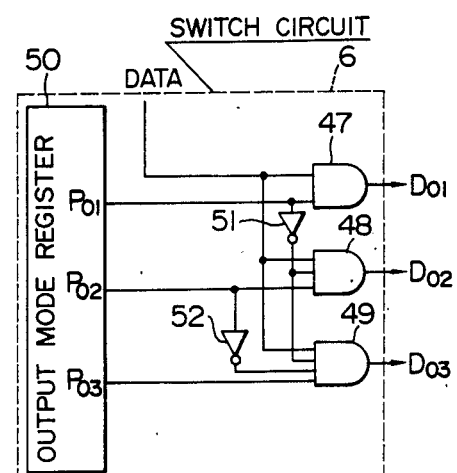
FIG. 4 is a circuit diagram showing an output-side switch circuit of the color separation system.

FIGS. 3 and 4 illustrate respectively examples of the basic constructions of the switch circuits 5 and 6.

In FIG. 3, input data $D_1$, $D_2$ and $D_3$ to the switch circuit 5 are respectively input data from the scanner input scanning part 2, layout operation part 3 and original picture setup inputting part 4. These input data $D_1$, $D_2$ and $D_3$ are usually parallel signals having a digital gradation of 8 bits×3. However, a processing circuit for only 1 bit is illustrated therein.

The input data $D_1$ is input to an AND circuit 40 and the output of the AND circuit 40 is converted to an output data $D_{out}$ by means of an OR circuit 41. The input data $D_2$ is input to an AND circuit 42 and is then output as an output data $D_{out}$ from the OR circuit 41. The input data $D_3$ is input to an AND circuit 43 and is then converted to an output Data $D_{out}$ by means of the OR circuit 41.

Numeral 44 indicates an input mode register. Priority setting signals ($P_1$, $P_2$, $P_3$) among the three types of input devices are input to the mode register 44 by means of the keyboard 10 and are set up by the CPU 11. These signals are designed in such a way that the selection modes of the scanner input scanning part 2, layout operation part 3 and original picture setup inputting part 4 are respectively (1,0,0), (0,1,0) and (0,0,1). The priority setting signals $P_1$, $P_2$ and $P_3$ are input respectively in the AND circuits 40, 42 and 43. On the other hand, a $P_1$ output terminal is connected via an inverter 45 to the AND circuits 42 and 43. A $P_2$ ouput terminal is connected via an inverter 46 to the AND circuit 43, so that the priority of the input data $D_1$, $D_2$ and $D_3$ are set with $D_1$ being the highest and $D_3$ being the lowest.

In FIG. 4, data to the switch circuit 6, in other words, output data from the scanner data processor 1 are supplied respectively through AND circuits 47, 48 and 49 to the scanner output recording part 7, layout display part 8 and original picture setup display part 9 as data $D_{01}$, $D_{02}$ and $D_{03}$.

Numeral 50 indicates an output mode register. Priority setting signals ($P_{01}$, $P_{02}$, $P_{03}$), which are input by the keyboard 10 to the mode register 50 and are set up by the CPU 11, generate selection modes (1,0,0), (0,1,0) and (0,0,1) respectively. Namely, a $P_{01}$ output terminal is connected to the AND circuit 47 and is also connected via an inverter 51 to the AND circuits 48,49. A $P_{02}$ output terminal is connected to the AND circuit 48 and is also connected to the AND circuit 49 by way of the inverter 52. On the other hand, a $P_{03}$ output circuit is connected to the AND circuit 49.

The input and output relationship between the switch circuits 5 and 6 can be determined by combining the setting signals ($P_1$, $P_2$, $P_3$) of the mode register 44 and the setting signals ($P_{01}$, $P_{02}$, $P_{03}$) of the mode register 50.

Figure 5:
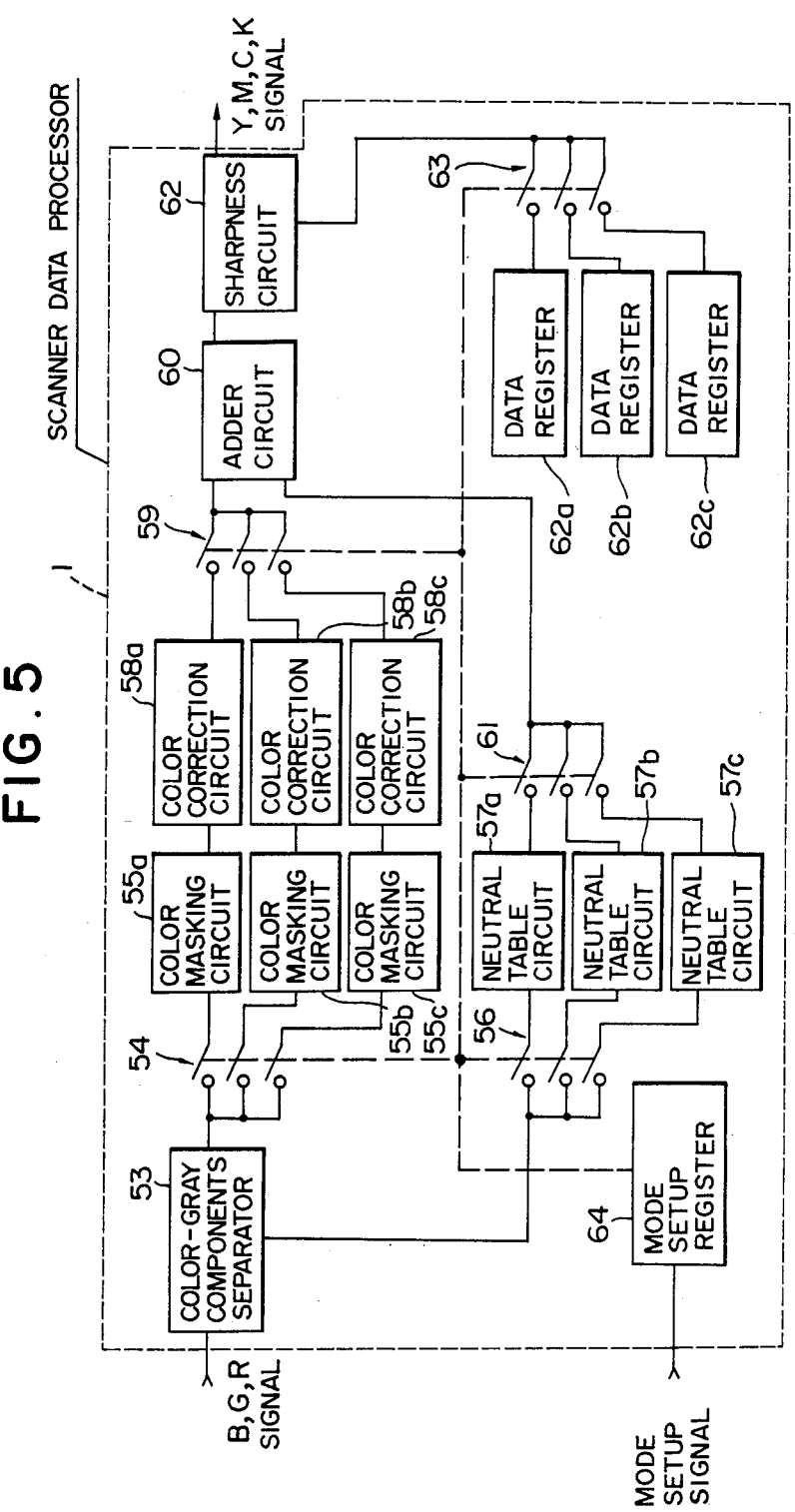
FIG. 5 is a block diagram showing a scanner data processor which performs multiple real time processings.

In FIG. 5, the look-up tables and data registers of the scanner data processor 1 are arranged parallelly, correspondingly to their respective picture input devices which are connected to the look-up tables and data registers respectively.

A color-gray components separator 53 is connected via a switch circuit 54 to color masking circuits 55a,55b,55c and, at the same time, is connected via a switch circuit 56 to neutral table circuits 57a,57b,57c. The color masking circuits 55a,55b,55c are respectively connected to color correction circuits 58a,58b,58c. The output terminals of the color correction circuits 58a, 58b 58c are connected, via a switch circuit 59, to one of input terminals of an ADDER circuit 60. To the other input terminal of the ADDER circuit 60, each of the output terminals of the neutral table circuits 57a,57b,57c is connected with a switch circuit 61 interposed therebetween.

Designated at numeral 62 is a sharpness circuit which is connected via a switch circuit 63 to data registers 62a,62b,62c. The sharpness circuit 62 is also connected to the output terminal of the ADDER circuit 60.

The switch circuits 54,56,59,61,63 are each ON-OFF controlled by the mode set up register 64 which is connected to the CPU 11 so as to effect the setting-up of the mode.

Incidentally, the color masking circuits 55a,55b,55c, neutral table circuits 57a,57b,57c, color correction circuits 58a,58b,58c and data registers 62a,62b,62c are individually fed with data and writing-in control signals from the CPU 11 via the CPU line 31 which is not shown in FIG. 5.

So long as table data and register data are prepared and are set up in advance corresponding to picture signals supplied from the input devices in the scanner data processor 1 as mentioned above, supplied picture signals can be subjected to arithmetic processings without failure no matter which picture input devices the scanner data processor 1 is connected to.

When, for example, effective picture signals on one scanning line of the scanner input scanning part 2 are subjected to an arithmetic processing at the scanner data processor 1 and, immediately after the above processing, data which have been read out to the buffer memory 20 from the disc memory 19 of the layout operation part 3 are supplied via the data buffer 21 to the scanner data processor 1, the table data and data registers in the scanner data processor 1 have to be rewritten from the CPU line 31 if the table data and data registers are of the construction shown in FIG. 2. If the table data and data registers have the structure shown in FIG. 5, it is possible to store in advance in specific look-up table data registers. Accordingly, it is only necessary to change over each of the switch circuits 54,56,59,61,63 by means of the mode set up register 64. Thus, using the mode register 44 of the input-side switch circuit 5, picture signals supplied respectively and simultaneously from the scanner input scanning part 2, layout operation part 3 and original setup inputting part 4 having different degrees of priority can be subjected to arithmetic processings by determining the order of their priority by time-division techniques.

By using FIFO-type data buffers as the data buffers 21,24, the timing control of the transfer of data can be carried out with ease even if all input devices are operated asynchronously.

In addition, these mode register 44 and mode setup register 64 may individually be constructed of their own microcomputers so as to operate them independently from the CPU 11.

Namely, the mode may be changed when a demand for the use of the data processor has reached the CPU from either one of the input devices, even if an input device of low priority is in operation. Since the changeover of the mode cannot be effected at free will, the mode may be changed while data already input and processed are output or when the operation is at a good point to leave off, for example, when the priority of data from the layout part is the highest, when the priority of data from the scanner inputting part is the second highest, or in a time period after one scanning line of layout outputs has been processed and until the next scanning line of layout outputs comes.

For this purpose, the layout operation part 3 and scanner input scanning part 2 are provided respectively with FIFO buffers. When these data are delivered from both of the layout operation part 3 and scanner input scanning part 2 without any interval therebetween and the FIFO buffers are hence overflown, the CPU 11 modifies the above conditions so as to perform the work of either one of the parts prior to the work of the other part because the above situation can be foreseen.

The control of various picture input devices in accordance with such a mode setting as described above can also be carried out on the plurality of picture reproducing units connected via the output-side switch circuit 6, namely, on data to be output to the scanner output recording part 7 and color monitors 32,37, thereby making it possible to perform real-time multiprocessings by means of a single unit of the scanner data processor 1.

Having now fully described the invention, it will be apparent to one of ordinary skill in the art that many changes and modifications can be made thereto without departing from the spirit or scope of the invention as set forth herein.

What is claimed is:

1. A color separation system comprising:
   a plurality of picture input units, each unit supplying a set of color-separated picture signals corresponding to color components to be subjected to color tone conrols;
   a scanner data processor for selectively receiving a set of color-separated picture signals from one of the plurality of picture input units and containing at least one set of look-up tables adapted to carry out desired color tone controls on the thus-received set of color-separated picture signals;
   a pluraltiy of picture reproducing units, each unit for reproducing a permanent or temporary picture;
   at least one central processing unit adapted to selectively control the distribution of a processed set of color-separated picture signals from the scanner data processor to one of the plurality of reproducing units so as to obtain a reproduced permanent or temporary picture; and
   a plurality of data registers corresponding to said plurality of picture input units which supply said look-up tables with data used to perform color tone controls on color-separated picture signals from the plurality of picture input units;
   wherein a set of color-separated picture signals is selected for input to said scanner data processor in accordance with a predetermined order of preference among the plurality of picture input units.

2. A color separation system as claimed in claim 1, wherein the scanner data processor farther includes means adapted to enhance the sharpness of each of the color-separated picture signals and means for distributing the resulting sharpness-enhanced color-separated picture signals to any one of the plurality of picture reproducing units.

3. A color separation system as claimed in claim 1, wherein the plurality of picture input units and the plurality of picture reproducing units are equipped with buffer memories, and wherein at least one of the picture input units or one of the picture reproducing units is asynchronously controlled by the central processing unit, said at least one of the picture input units or one of the picture reproducing units being controlled to send or receive a selected set of color-separated picture signals asynchronously with the operation of said at least one of said units when the scanner data processor receives or distributes the selected set of color-separated picture signals in accordance with a predetermined order of preference.

4. A color separation system comprising:
   a plurality of picture input units, each unit supplying a set of color-separated picture signals corresponding to color components to be subjected to color tone controls;
   a scanner data processor for selectively receiving a set of color-separated picture signals from one of the plurality of picture input units and containing at least one set of look-up tables adapted to carry out desired color tone controls on the thus-received set of color-separated picture signals;
   a plurality of picture reproducing units, each unit for reproducing a permanent or temporary picture; and
   at least one central processing unit adapted to selectively control the distribution of a processed set of color-separated picture signals from the scanner data processor to one of the plurality of reproducing units so as to obtain a reproduced permanent or temporary picture; and
   wherein the plurality of picutre input units and the plurality of picture reproducing units are equipped with buffer memories from and to respectively, which are sent selected sets of color-separated pictures signals asynchronously with the operation of each of the picture input units and each of the picture reproducing units when the scanner data processor receives a set of color-separated picture signals from any one of the plurality of input units and distributes a processed set of color-separated picture signals to any one of the plurality of picture reproducing units in accordance with a predetermined order of preference.

* * * * *